(12) United States Patent
Tanner

(10) Patent No.: US 12,196,322 B1
(45) Date of Patent: Jan. 14, 2025

(54) GLAND SEAL ASSEMBLY

(71) Applicant: Sealing Equipment Products Co., Inc., Alabaster, AL (US)

(72) Inventor: Chuck Tanner, Thorsby, AL (US)

(73) Assignee: Sealing Equipment Products Co., Inc., Alabaster, AL (US)

( * ) Notice: Subject to any disclaimer, the term of this patent is extended or adjusted under 35 U.S.C. 154(b) by 286 days.

(21) Appl. No.: 17/824,354

(22) Filed: May 25, 2022

Related U.S. Application Data

(60) Provisional application No. 63/193,423, filed on May 26, 2021.

(51) Int. Cl.
*F16J 15/40* (2006.01)
*F16J 15/00* (2006.01)

(52) U.S. Cl.
CPC ........... *F16J 15/406* (2013.01); *F16J 15/002* (2013.01)

(58) Field of Classification Search
CPC .......... F16J 15/002; F16J 15/18; F16J 15/182; F16J 15/26; F16J 15/40; F16J 15/406
See application file for complete search history.

(56) References Cited

U.S. PATENT DOCUMENTS

| | | | | |
|---|---|---|---|---|
| 2,486,939 A | * | 11/1949 | Freund | F16J 15/40 277/516 |
| 3,403,915 A | * | 10/1968 | Roberts | F16J 15/40 277/927 |
| 4,270,762 A | * | 6/1981 | Johnston | F23K 1/00 277/306 |
| 4,534,569 A | * | 8/1985 | Ishitani | F16J 15/46 277/351 |
| 4,765,631 A | * | 8/1988 | Kohnen | F16J 15/162 277/517 |

* cited by examiner

*Primary Examiner* — Nicholas L Foster
(74) *Attorney, Agent, or Firm* — Jones Walker LLP

(57) ABSTRACT

A gland seal assembly including a stuffing box and packing positioned within the stuffing box. A gas seal assembly is mounted adjacent the stuffing box, the gas seal assembly including a gas inlet port and a gas outlet port interconnected by one or more passageways. A gland follower is positioned partially within the gas seal assembly and in adjustable engagement with the packing. The gas seal assembly further includes gas dispersal device receiving gas from the gas inlet port and directing gas into a shaft aperture formed through the gas seal assembly.

19 Claims, 6 Drawing Sheets

GLAND SEAL ASSEMBLY

CROSS REFERENCE TO RELATED APPLICATION

This application claims the benefit under 35 UC § 119 (c) of U.S. Provisional Application 63/193,423 filed May 26, 2021, which is incorporated by reference herein in its entirety.

BACKGROUND

Industrial plants utilize complex process control systems and devices to control the flow of liquids and gases utilized in industrial processes. Inevitably, there are leaks and other irregular releases of gases or vapors from unintended sources such as valves, pumps, and plumbing involved in the process stream. Emissions from unintended sources are often referred to as "fugitive emissions." Because of the large number of potential leak sources at large industrial facilities, fugitive emissions can be a significant proportion of total emissions. Even when the total volume of fugitive emissions is small, certain compositions such as volatile organic compounds (VOC's), are known to cause serious health or environmental impacts. In addition to the negative environmental impact, fugitive emissions can also result in the loss of a portion of the process fluids themselves, thus representing a direct financial loss to the plant operator. Other indirect costs associated with fugitive emissions include the labor and materials necessary to detect and repair leaks, increased efforts to maintain regulatory compliance, and legal liability. The elimination or reduction of fugitive emissions could help protect the environment while lowering operational costs for industrial facilities.

Centrifugal pumps, which contain a rotating impeller positioned within a stationary pump casing, are widely utilized in industrial settings. However, they are also a significant source of fugitive emissions. Significant pressure is developed within the volute of the stationary pump casing during operation due to the rotation of the impeller at high speeds. With increased pressure inside of the volute, the fluid will gravitate towards areas of lower pressure. In almost all centrifugal pumps, the rotating shaft that drives the impeller penetrates the pressure boundary of the pump casing, thereby creating a low pressure area that draws fluid from the volute. Thus, a sealing means must be used to control the amount of fluids and entrained gases that leak along the driveshaft at the driveshaft-pump casing interface.

One of the simplest types of sealing means along the driveshaft is a gland seal assembly comprising a gland seal positioned within a stuffing box. The stuffing box is a cylindrical space in the pump casing surrounding the shaft. Rings of braided, fibrous material, such as graphited or non-graphited acrylic, polytetrafluoroethylene (PTFE) or other materials, are stuffed into the stuffing box around the outside diameter of the pump shaft to control the rate of leakage along the shaft. The packing rings are held in place by a gland. The gland is, in turn, held in place by studs with adjusting nuts. As the adjusting nuts are tightened, they move the gland in and compress the packing. This axial compression causes the packing to expand radially, forming a tight seal between the rotating shaft and the inside wall of the stuffing box. Gland seal assemblies are normally designed to allow a small amount of controlled leakage along the shaft to provide lubrication and cooling to the packing. The leakage rate can be adjusted by tightening and loosening the packing gland. In applications where controlled leakage is not an option for providing lubrication and cooling for the packing, a lantern ring—which is a perforated hollow ring positioned near the center of the packing box that receives relatively cool, clean liquid from either the discharge of the pump or from an external source and distributes the liquid uniformly around the shaft to provide lubrication and cooling—may be utilized. The fluid entering the lantern ring can cool the shaft and packing, lubricate the packing, or seal the joint between the shaft and packing against leakage of air into the pump in the event the pump suction pressure is less than that of the atmosphere.

Mechanical seals are another common type of sealing means along the driveshaft of a centrifugal pump. In their most basic form, mechanical seals consist of a rotating element attached to the pump shaft and a stationary element attached to the pump casing. Each of these elements has a highly polished sealing surface. The polished faces of the rotating and stationary elements come into contact with each other to form a seal that prevents leakage along the shaft. Although mechanical seals typically are more expensive that stuffing boxes, mechanical seals can eliminate leakage in certain applications.

A drawback of mechanical seals, however, is that most mechanical seals tolerate very little radial movement or misalignment, and little to no axial movement. Shaft finish, pump/driver alignment, cavitation, and vibration can all negatively impact the performance and durability of mechanical seals. Also, mechanical seals typically require equipment to be in good condition to operate reliably. Thus, in certain applications, a gland seal assembly is the preferred sealing means option from a cost, case of installation, and maintenance standpoints. However, the continued use of gland seal assemblies is increasingly coming under scrutiny due to the environmental concerns surrounding fugitive emissions. Conventional gland seal assemblies are ineffective at preventing the escape of fugitive emissions into the atmosphere. An improved gland sealing system is needed to leverage the benefits of gland seal assemblies while reducing or eliminating the risk of fugitive emissions.

SUMMARY OF INVENTION

The invention disclosed herein is generally directed to an improved gland seal assembly capable of capturing fugitive emissions. The improved gland seal assembly of the present invention utilizes pressurized gas to redirect fugitive emissions through a purge port formed in the seal, thereby allowing the fugitive emissions to be captured and dispensed with in a controlled manner.

In an embodiment exemplifying the principles of the invention, the improved gland seal assembly may comprise: i) a stuffing box; ii) packing positioned within the stuffing box; iii) an gas seal housing mounted to the stuffing box, the gas seal housing having a pressurized gas inlet port and a pressurized gas purge port interconnected by one or more passageways; iv) a gland follower positioned partially with the gas seal housing and in axial engagement with the packing; v) a packing gland adjustment subassembly comprising one or more adjusting nuts in threaded engagement with the gas seal housing and adjacent to the gland follower such that the inward or outward movement of the adjusting nut(s) along the threads causes the gland follower to move axially relative to the packing.

The improved gland seal assembly may be mounted on the atmosphere side of the drive shaft of a centrifugal pump. Pressured gas can be injected into the seal through one or more gas inlet ports. An inlet passageway formed in the seal directs the pressured gas to an inner dispersal ring having a close tolerance gap to the shaft's outer diameter. The dispersal ring evenly disperses the gas around the circumference of the shaft's outer surface. So long as the pressurized gas is kept at a greater pressure than the process fluids, the internal pressure of the seal will be greater than the pressure of the fugitive emissions, thereby creating a pressure boundary across the shaft's outer circumference. This pressure boundary will stop the flow of fugitive emissions along the shaft—a primary source for the release of fugitive emissions into the atmosphere for pumps. Instead, the improved gland seal assembly of the present invention is configured with an outlet passageway extending from the inner periphery of the seal (i.e., adjacent to the shaft's outer circumference) to the purge port positioned on the outer periphery of the seal. The pressurized gas, along with any and all fugitive emissions attempting to escape along the length of the shaft, will be routed through the outlet passageway to the purge port. The fugitive emissions can then be captured and dispensed with in a controlled, environmentally-conscious manner.

DETAILED DESCRIPTION OF SELECTED EMBODIMENTS

Figure 1:
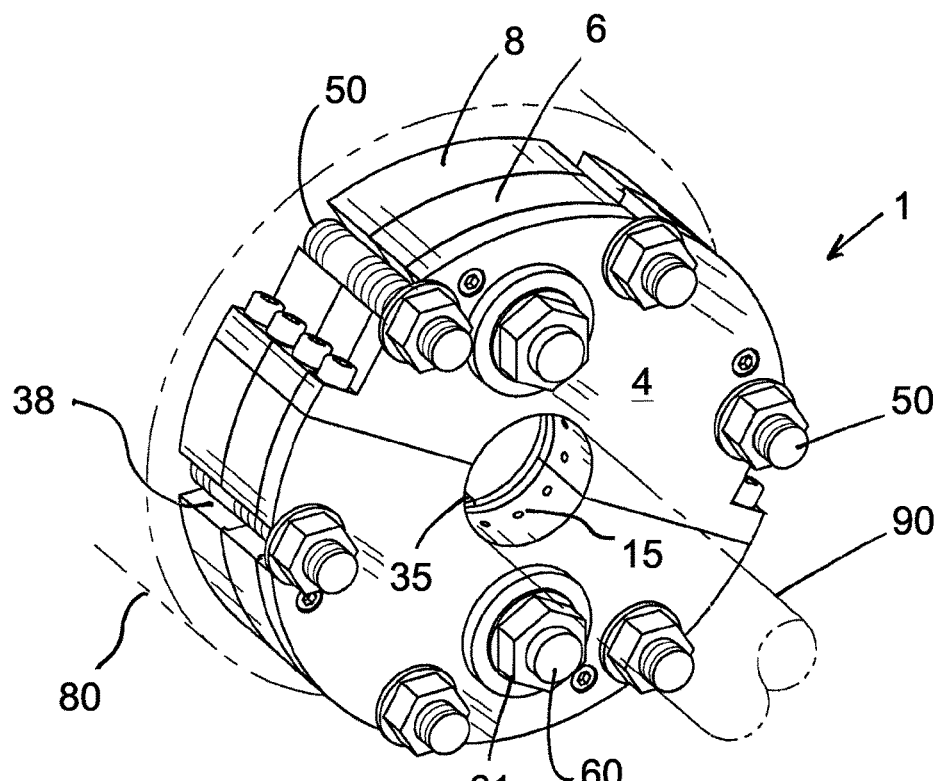
FIG. 1 is a perspective view of one embodiment of the gas seal assembly of the present invention.
Figure 2:
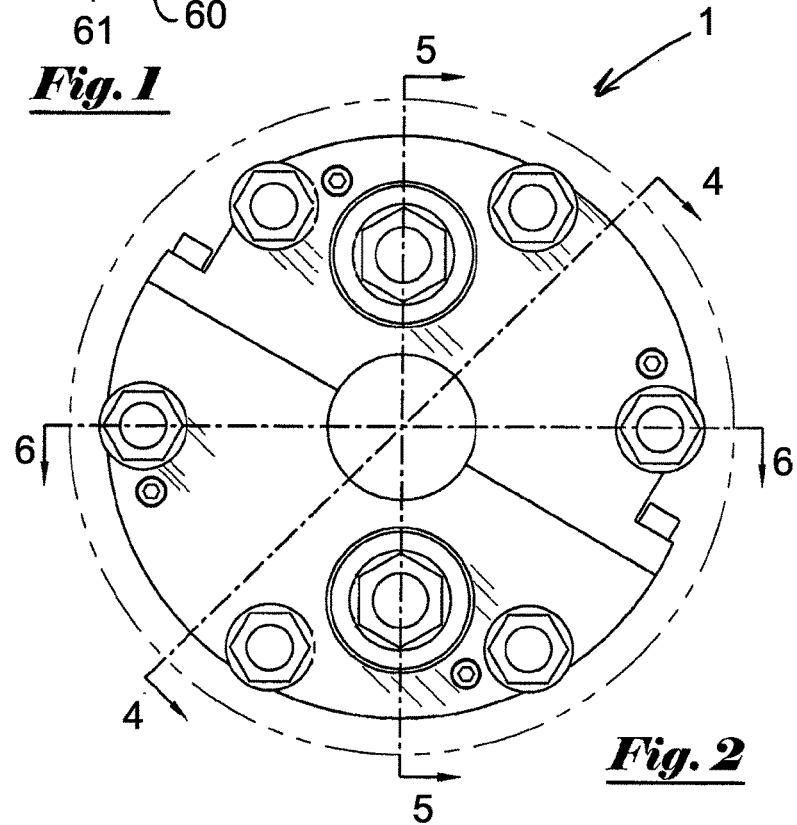
FIG. 2 is a planar front view of the gas seal assembly of FIG. 1 showing several section lines.
Figure 3:
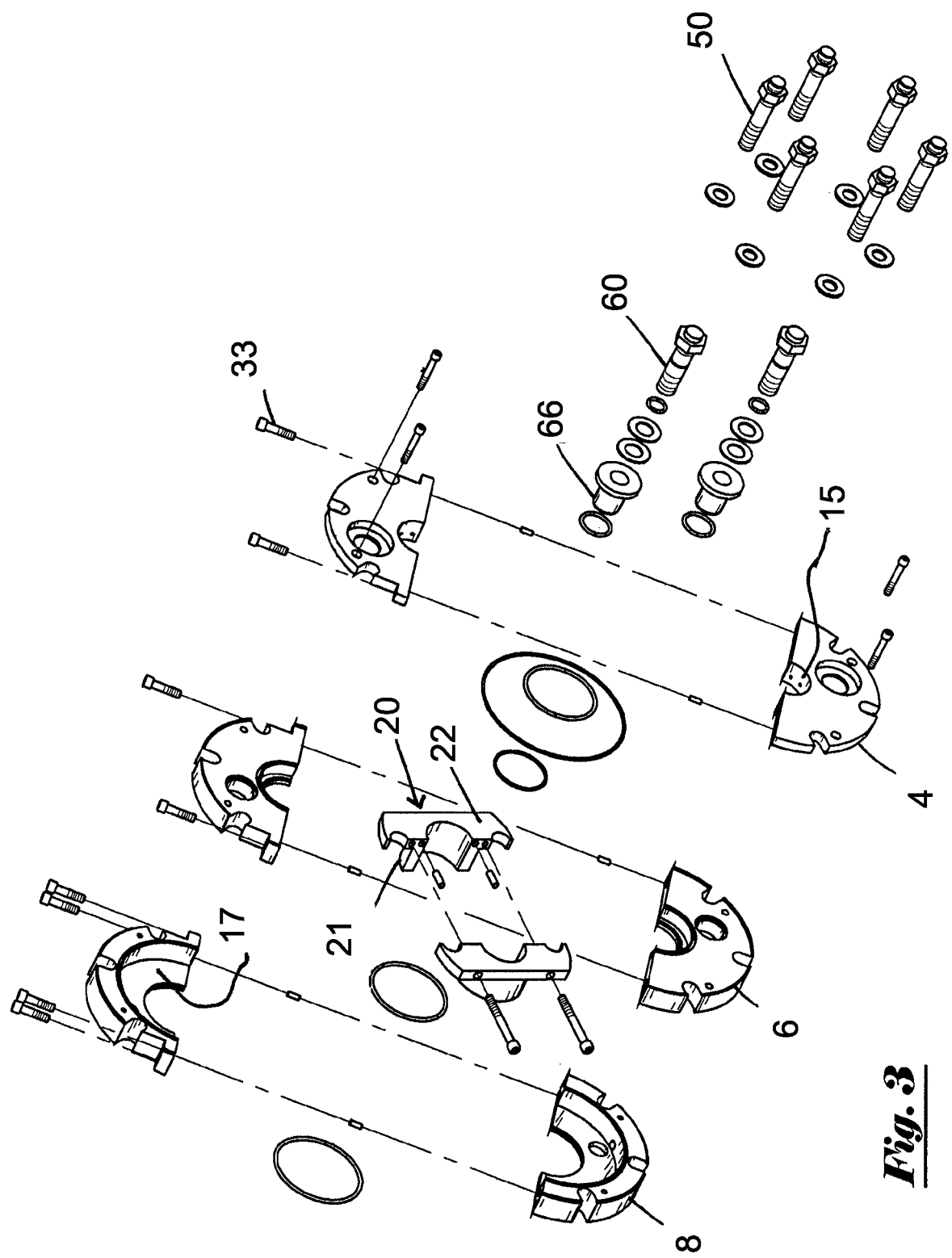
FIG. 3 is an exploded view of the gas seal assembly of FIG. 1.
Figure 4:
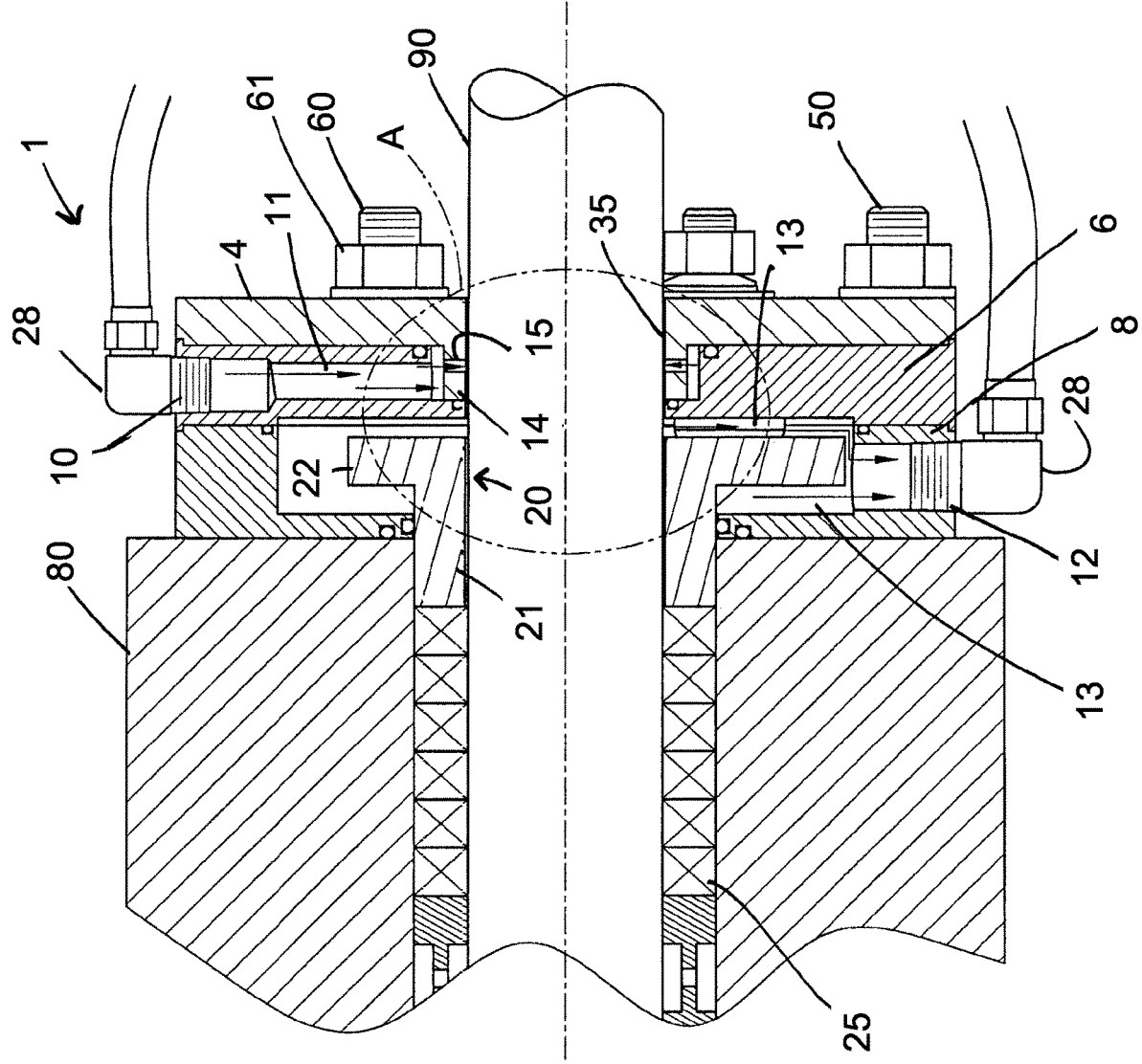
FIG. 4 is cross-section view taken along section line 4-4 seen in FIG. 2.
Figure 5:
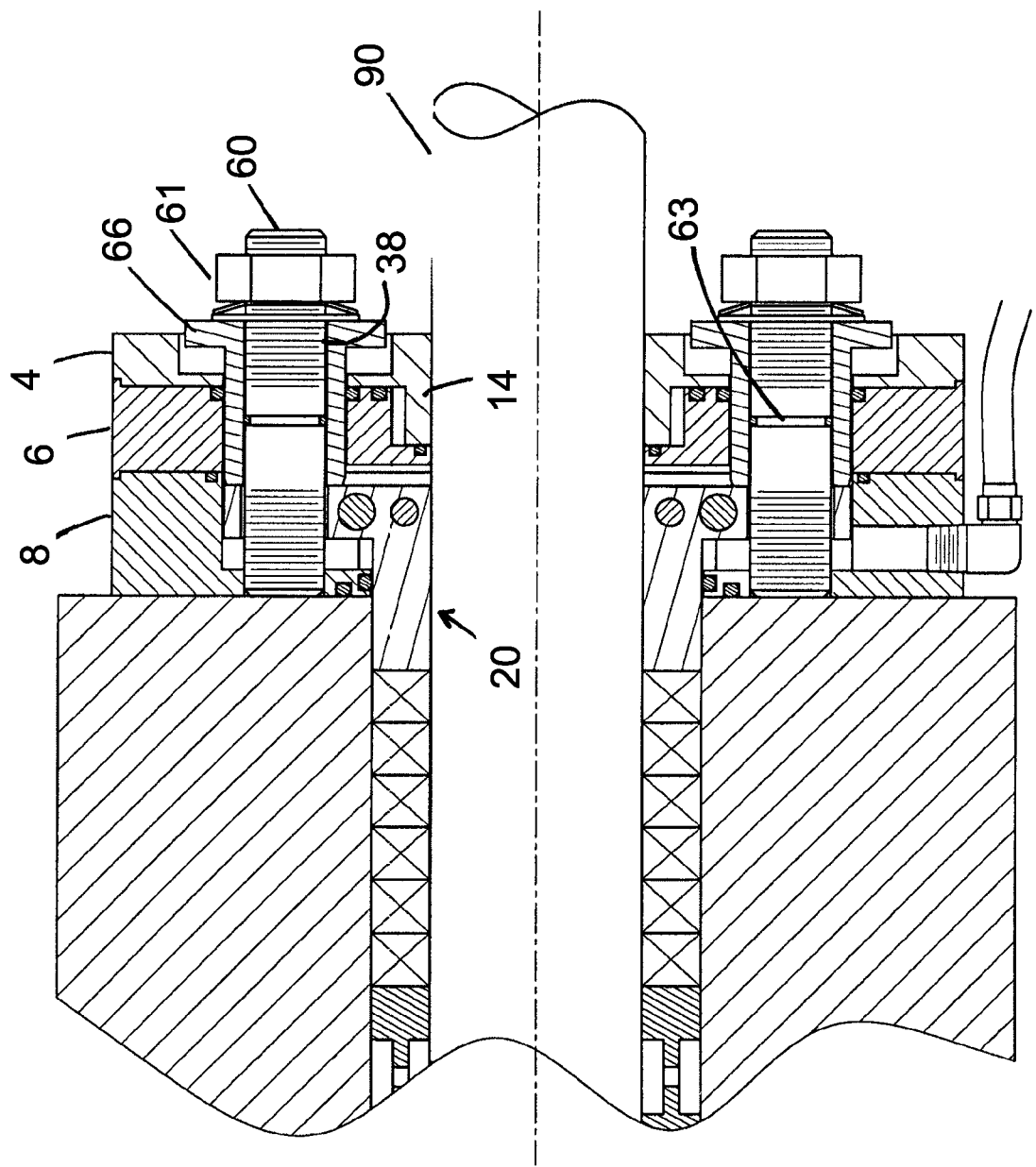
FIG. 5 is cross-section view taken along section line 5-5 seen in FIG. 2.

One embodiment of the invention may be understood viewing FIGS. 1 and 4. This embodiment is a gland seal assembly generally comprising the stuffing box 80 with the gas seal assembly 1 mounted on or adjacent to the stuffing box 80. As best seen in FIG. 4, the illustrated embodiment of stuffing box 80 contains the packing 25 which surrounds the pump shaft (or impellor shaft) 90. A series of mounting studs 50 (see FIGS. 1 and 6) extend from stuffing box 80. The illustrated embodiment of gas seal assembly 1 (sometimes also referred to as an "air seal" assembly) generally comprises a plurality of plates retained together and a central shaft aperture 35 extending through the plates. While figures illustrate three plates, i.e., inner plate 8, middle plate 6, and outer plate 4, other embodiments could conceivably have only two plates or more than three plates. Each of the plates will include the central shaft aperture 35 and a series of mounting stud apertures or cutouts 38 (see FIG. 1). As suggested in FIG. 3, certain embodiments will have the plates formed of two half-sections with the half-sections joined together with connecting screws 33. In FIG. 4, inner plate 8 is shown with a gas outlet port 12 (also sometimes referred to as the "purge port") formed on the circumferential edge of inner plate 8 and communicating with the gas outlet passageway 13 formed by an open interior space 17 (best seen in FIG. 3) of inner plate 8 abutting against the inner side of middle plate 6. As seen in FIGS. 3 and 4, the gland follower 20 is also positioned partially within the interior space 17. Gland follower 20 includes follower collar 21 and follower shoulder 22. Follower collar 21 extends into stuffing box 80 to engage the packing 25, while follower shoulder 22 remains within interior space 17. FIG. 5 illustrates how shoulder washers 66 positioned on threaded compression studs 60 (also referred to as threaded tightening lugs) can be moved toward follower shoulder 22 by a tool engagement surface such as nuts 61. It can be seen how force placed on follower shoulder 22 by shoulder washers 66 causes follower collar 21 to increasingly compress packing 25. In the FIG. 5 embodiment, compression studs 60 are anchored to the inner plate 8 and include O-ring grooves 63.

Figure 6:
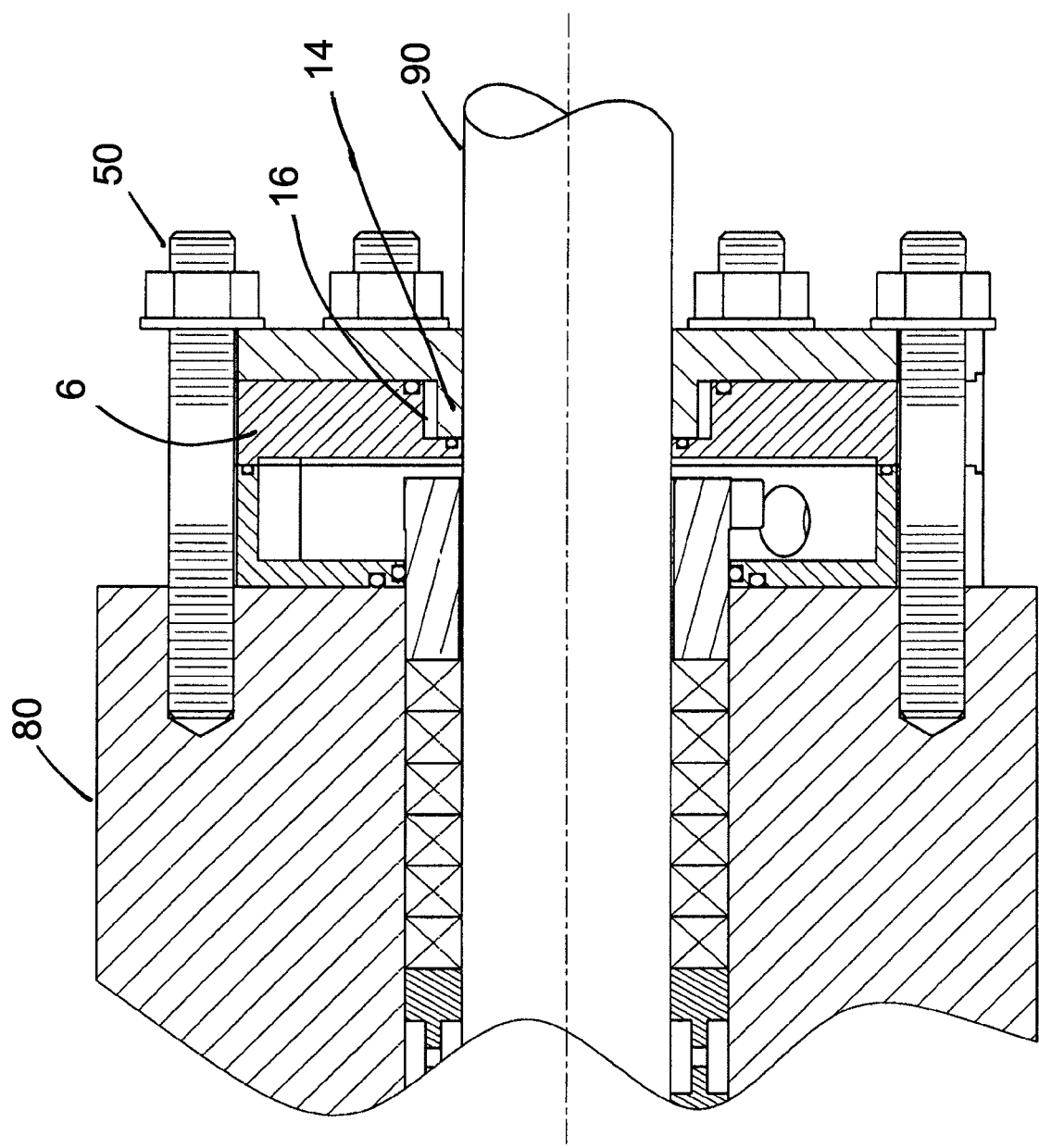
FIG. 6 is cross-section view taken along section line 6-6 seen in FIG. 2.

Returning to FIG. 4, it is seen that middle plate 6 is positioned adjacent to inner plate 8 and includes gas inlet port 10 formed on the circumferential edge of middle plate 6 and communicates with the inlet passageway 11, which extends through middle plate 6 to communicate with the periphery of central shaft aperture 35. Outer plate 4 is then positioned adjacent to middle plate 6. Formed around central shaft aperture 35 of outer plate 4 is the dispersal ring 14 having a series of dispersal apertures 15 (most clearly seen in FIGS. 1 and 3) spaced circumferentially around the dispersal ring 14. FIG. 6 illustrates how dispersal ring 14 creates an annular space 16 between dispersal ring 14 and a circular cutout around central shaft aperture 35 in middle plate 6. Viewing FIG. 4, it can be seen how fluid (preferably a gas such as air) travels through inlet passageway 11 and is distributed around shaft 90 via dispersal ring 14 and dispersal apertures 15. While dispersal ring 14 serves as the gas dispersal device in the illustrated embodiment, other means of distributing gas around shaft 90 could be employed.

Figure 7:
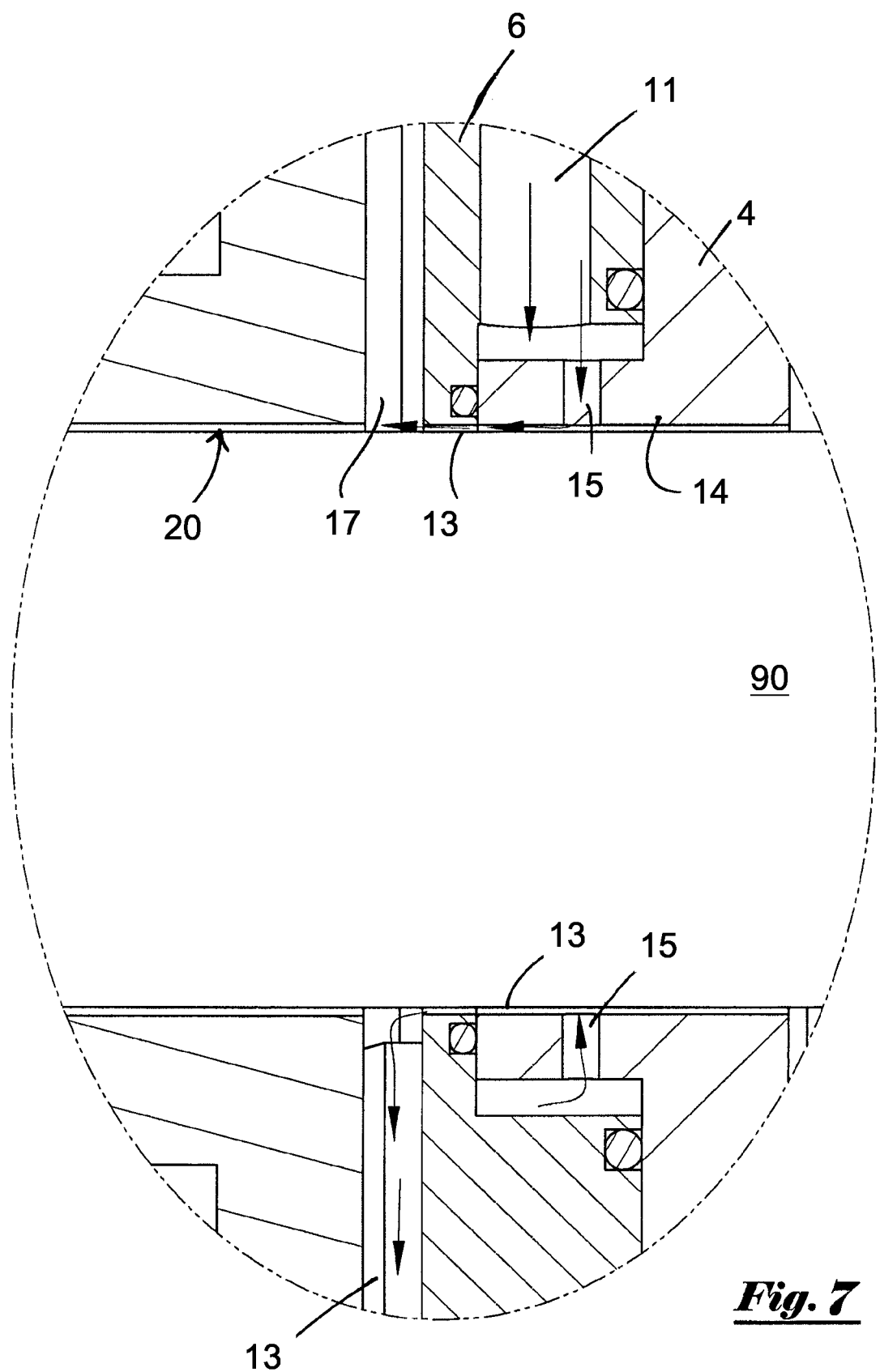
FIG. 7 is an enlarged view of the Detail A shown in FIG. 4.

A more detailed view of gas flow around shaft 90 is seen in FIG. 7. Gas is shown flowing through inlet passageway 11 and into dispersal ring apertures 15. Gas then flows in both directions along shaft 90, i.e., toward stuffing box 80 and toward the exterior face of gas seal assembly 1. Gas moves into open interior space 17 of inner plate 8 and then travels though outlet passageway 13 to be captured by an exhaust conduit attached to gas outlet port 12. It can be seen how any process fluids escaping past packing 25 along shaft 90 will also be directed to outlet passageway 13 rather than escaping into the outside environment. Typically, gas inflow through inlet passageway 11 will be sufficient to maintain a positive pressure around the shaft 90 at dispersal ring apertures 15. In situations where the stuffing box is performing as an efficient seal with the shaft, the pressure required passageway 11 may on need to be a few psi. On the other hand, an old seal or a seal beginning to fail may require a much higher pressure in passageway 11. Thus, gas pressure at gas inlet port 10 is kept at a pressure greater than a pressure of fugitive emissions escaping the stuffing box, thereby creating a pressure boundary across the shaft's outer circumference and stopping the flow of fugitive emissions far enough along the shaft to actually escaped into the outside environment. While the gas utilized is most frequently air, other comparatively inert gases could be used in specialized situations.

While the particular embodiments shown in the Figures have a gas inlet port 10 supplying pressurized air to create the pressure boundary across the shaft, other embodiments could eliminate the inlet port 10. In these alternative embodiments, a vacuum could be applied at the outlet port 12 to create the pressure boundary across the shaft without the need for a positive pressure source at inlet port 10. In these embodiments, much of the structure associated with delivering outside gas (e.g., passageway 11) could be eliminated as long as some perimeter space within the plates is formed around the shaft and communicates with a gas exhaust passageway(s) ultimately leading to the outlet port(s).

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

Although the invention has been described in terms of specific embodiments, all obvious variations and modifications should be considered as following within the scope of invention. For example, while the illustrated embodiments show the gas seal assembly as formed of plates, other embodiments could be formed of a one-piece, unitary housing. Likewise, while one embodiment of the invention has been described as the gland seal assembly comprising the gas seal combined with the stuffing box, it will be understood the gas seal assembly alone comprises another embodiment of the invention. All such variations are within the scope of present invention.

The invention claimed is:

1. A gland seal assembly comprising:
   (a) a stuffing box;
   (b) a packing positioned within the stuffing box;
   (c) a gas seal assembly mounted adjacent the stuffing box, the gas seal assembly comprising a plurality of plates retained together and including a shaft aperture extending through the plates, wherein the gas seal assembly includes a gas inlet port and a gas outlet port interconnected by one or more gas passageways;
   (d) a gland follower positioned partially within the gas seal assembly and in adjustable engagement with the packing;
   (e) wherein the gas seal assembly further includes gas dispersal device communicating with the one or more gas passageways and directing gas around a perimeter of the shaft aperture formed through the plates of the gas seal assembly.

2. The gland seal assembly according to claim 1, wherein the gas dispersal device is a dispersal ring with a plurality of injection apertures spaced circumferentially around the dispersal ring.

3. The gland seal assembly according to claim 2, wherein a gas inlet passageway connects the gas inlet port to the dispersal ring.

4. The gland seal assembly according to claim 3, wherein a gas outlet passageway connects the injection apertures of the dispersal ring to the gas outlet port.

5. The gland seal assembly according to claim 1, wherein the plurality of plates comprises at least two parallel plates, with one of the plates being an inner plate positioned adjacent to the stuffing box and one of the plates being an outer plate positioned distal from the stuffing box.

6. The gland seal assembly according to claim 2, wherein the dispersal ring is formed on one of the plates.

7. The gland seal assembly according to claim 5, further comprising at least one middle plate positioned between the inner plate and the outer plate.

8. The gland seal assembly according to claim 7, wherein the gas inlet port is formed in one of the plates and the gas outlet port is formed in another of the plates.

9. The gland seal assembly according to claim 1, further comprising a gland follower compression assembly.

10. The gland seal assembly according to claim 5, further comprising a gland follower compression assembly.

11. The gland seal assembly according to claim 10, wherein the gland follower compression assembly includes at least one threaded tightening lug applying compressive force to the gland follower.

12. The gland seal assembly according to claim 11, wherein the threaded tightening lug is anchored to the inner plate and has a tool engagement surface extending beyond the outer plate.

13. The gland seal assembly according to claim 12, wherein the threaded tightening lug includes a threaded shaft and a nut forming the tool engagement surface.

14. The gland seal assembly according to claim 13, wherein the nut exerts force on a shoulder washer which transfers compressive force to the gland follower.

15. A gas seal assembly comprising:
   (a) a plurality of plates retained together and including a shaft aperture extending through the plates;
   (b) at least one gas inlet port, at least one gas outlet port, and one or more gas passageways connecting the gas inlet port and the gas outlet port;
   (c) a gas dispersal device communicating with the one or more gas passageways, the gas dispersal device configured to distribute gas around a perimeter of the shaft aperture.

16. The gas seal assembly of claim 15, wherein the gas inlet port is formed on a circumferential edge of a first plate and the gas outlet port is formed on a circumferential edge of a second plate.

17. The gas seal assembly of claim 15, wherein the gas dispersal device is a dispersal ring with a plurality of injection apertures spaced circumferentially around the dispersal ring.

18. The gas seal assembly of claim 15, further comprising a gland follower positioned between the plates.

19. The gas seal assembly of claim 18, wherein at least one threaded tightening lug is configured to apply compressive force to the gland follower.

* * * * *